United States Patent
Baker et al.

(10) Patent No.: US 10,678,773 B2
(45) Date of Patent: Jun. 9, 2020

(54) PARALLEL PROCESSING OF DISJOINT CHANGE STREAMS INTO A SINGLE STREAM

(71) Applicant: salesforce.com, inc., San Francisco, CA (US)

(72) Inventors: Gary Baker, Zephyr Cove, NV (US); Mikhail Chainani, San Francisco, CA (US); Varun Jobanputra, San Francisco, CA (US); William Dumaresq, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 439 days.

(21) Appl. No.: 15/686,640

(22) Filed: Aug. 25, 2017

(65) Prior Publication Data
US 2019/0065542 A1 Feb. 28, 2019

(51) Int. Cl.
*G06F 16/27* (2019.01)
*G06F 16/23* (2019.01)
*G06F 21/62* (2013.01)
*G06F 16/21* (2019.01)
*G06F 16/2455* (2019.01)

(52) U.S. Cl.
CPC ........ *G06F 16/2358* (2019.01); *G06F 16/214* (2019.01); *G06F 16/24568* (2019.01); *G06F 16/27* (2019.01); *G06F 16/273* (2019.01); *G06F 21/6218* (2013.01)

(58) Field of Classification Search
CPC ............... G06F 16/214; G06F 16/2358; G06F 16/27–278
USPC .......................................................... 707/625
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,870,761 A * | 2/1999 | Demers ................. G06F 16/275 |
| 5,873,096 A | 2/1999 | Lim et al. |

(Continued)

OTHER PUBLICATIONS

Bobrowski, Steve. (Mar. 2016). The Force.com Multitenant Architecture—An Under the Hood Look at Force.com. Retrieved from https://developer.salesforce.com/page/Multi_Tenant_Architecture.

*Primary Examiner* — Robert W Beausoliel, Jr.
*Assistant Examiner* — Nirav K Khakhar
(74) *Attorney, Agent, or Firm* — Lowenstein Sandler LLP

(57) ABSTRACT

Technology for tracking changes to a database and providing the changes to a subscribing computing device. In an illustrative implementation, a method may involve subscribing a computing device to changes of a portion of a multi-tenant database and accessing a plurality of change events stored in a log of the multi-tenant database in parallel. The method may further involve storing the plurality of change events in a persistent data store separate from the multi-tenant database and processing the plurality of change events to create an ordered set of change events. The ordered set of change events may then be provided to the computing device that subscribed to the changes.

20 Claims, 6 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,529,728 B2 | 5/2009 | Weissman et al. |
| 7,620,655 B2 | 11/2009 | Larsson |
| 7,765,186 B1 * | 7/2010 | Hu ............ G06F 9/466 707/612 |
| 7,779,039 B2 | 8/2010 | Weissman et al. |
| 8,055,613 B1 * | 11/2011 | Mu ............ G06F 16/1734 707/610 |
| 8,433,771 B1 * | 4/2013 | Ellsworth ...... H04L 67/125 709/213 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2016/0078085 A1 * | 3/2016 | Hu ............ G06F 16/254 707/765 |

\* cited by examiner

PARALLEL PROCESSING OF DISJOINT CHANGE STREAMS INTO A SINGLE STREAM

COPYRIGHT NOTICE

Portions of the disclosure of this patent document may contain material subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database change tracking and, more specifically, to parallel processing of database logs to provide change tracking features.

BACKGROUND

Modern computer systems often use databases to organize collections of data. The databases are typically managed by a database management system (DBMS) that interacts with client devices to enable the client devices to access and alter data within the databases. Database management systems are often designed to be fault tolerant and to log modifications to the data before, during, and after the modification is applied to a database. This enables the database management system to redo or undo a change if it is interrupted prior to the modification being completed. For example, if a transaction requires multiple operations and there is a power outage after completing a first operation but before applying the remaining operations the log may be used to undo the first operation or subsequently apply the remaining operations so that the data is in a consistent state.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Figure 1:
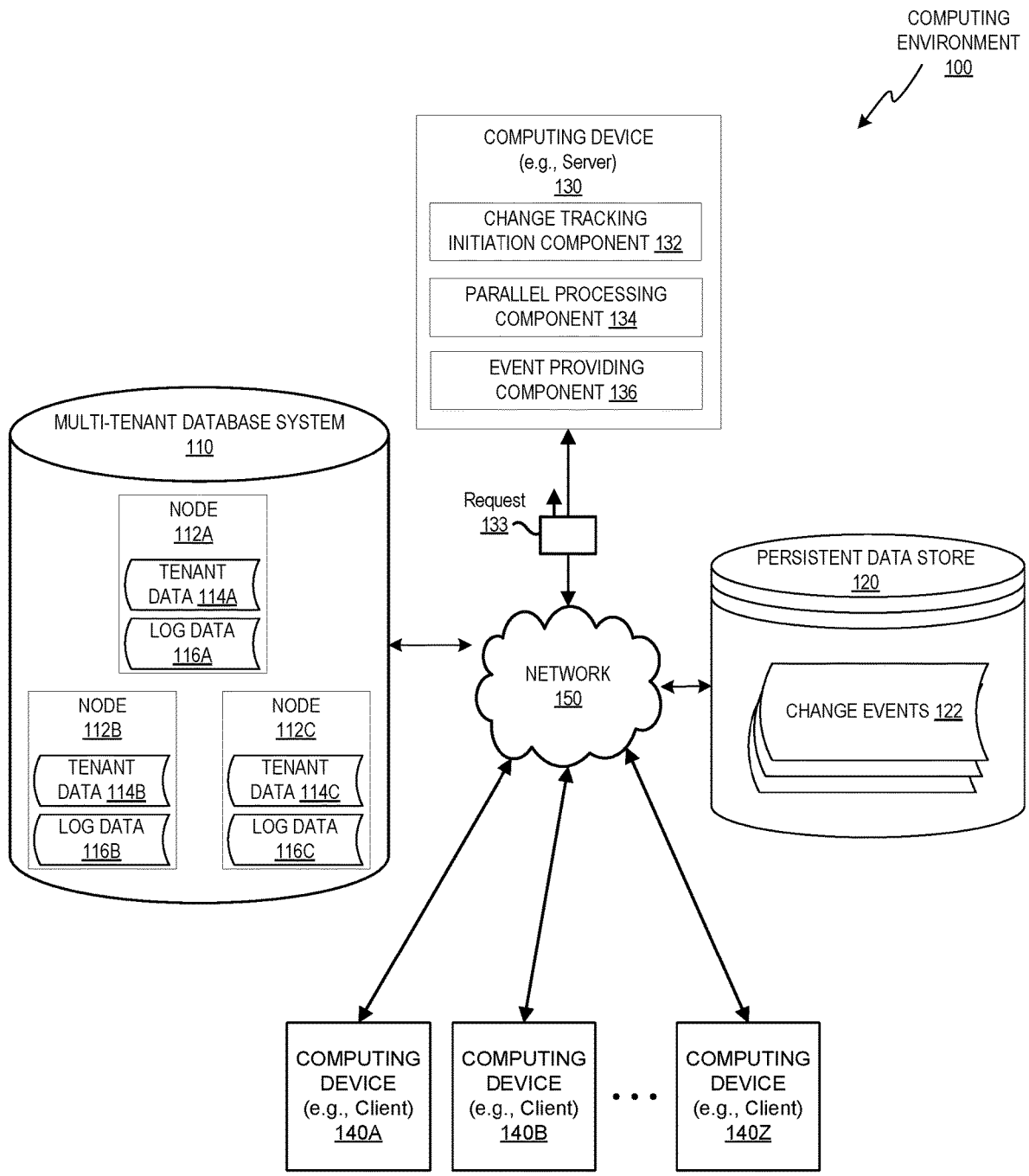
FIG. 1 shows a block diagram of an example computing environment in which change tracking may be implemented, according to some implementations.

Examples of systems, computer-readable storage media and methods according to the disclosed implementations are described in this section. The examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Implementations of database change tracking technology are provided herein and may enhance the detection and sharing of database changes. Traditional general-purpose database management systems often include triggers that can be used to track changes to a database. The triggers can include one or more conditional statements and may perform one or more actions before, during, or after a change is applied to the database. For example, a trigger may detect when a particular record is changed and may send an email alert to an owner of the record. The triggers are typically executed and managed by the general-purpose database management system and may adversely effect the performance of the database management system.

The changes that occur within a database may also be reflected in a database log. The database log may be on the same machine as the database or on a different machine and may be accessed using a mechanism that is separate from the mechanism used to access or alter the database. The database log may be stored as one or more log files that are spread across one or more machines. Each log file may correspond to a particular time interval (e.g., one hour, one day, one week) and multiple log files may be analyzed to track changes over larger intervals of time. Gathering data from the logs in a chronological or serial manner may be very time consuming and may delay the analysis of changes occurring to the database.

Aspects of the present disclosure may address the above noted and other deficiencies by introducing technology for enhancing the tracking and dissemination of database changes via enhanced parallization. In an illustrative implementation, the technology may enable a computing device to subscribe to changes of a portion of a database by sending a request to a server. The server may access change events stored in multiple logs of the database. The quantity of change events may be very large and the server may access and store the change events in a parallel manner into a persistent data store separate from the database. The server may process the change events in parallel and out of order (e.g., non-chronological) to create an ordered set of change events. The server may then provide the computing device that subscribed to the changes with access to the ordered set of change events. In one example, this may involve generating and transmitting a stream of change events to the computing device.

Systems and methods described herein include technology that enhances the performance and scalability of a database management system. In particular, aspects of the present disclosure may reduce the amount of processing performed by the database management system by offloading tasks for tracking and dissemination to another computing process or device. In one example, the enhanced manner of tracking and dissemination change events may enable a client of the database to subscribe to changes without adversely affecting the performance of the database. In another example, the technology may be used for copying a portion of a database without accessing the database directly. The copying may enable larger scale operations such as migrating, duplicating, or synchronizing, of a portion of a database. The operations may only relate to a particular portion of the database and the remaining portions of the database may remain protected (e.g., un-accessed, hidden, secret).

Various aspects of the above referenced methods and systems are described in details herein below by way of examples, rather than by way of limitation.

FIG. 1 shows a block diagram of an example of a computing environment 100 for tracking and disseminating changes of a database system, in accordance with some implementations. It should be noted that other arrangements for computing environment 100 are possible, and that the implementation of a computer system utilizing embodiments of the disclosure are not necessarily limited to the specific environment depicted. In the example shown, computing environment 100 may include a multi-tenant database system 110, a persistent data store 120, one or more computing devices 130 (e.g., servers), one or more computing devices 140A-Z (e.g., clients), and a network. In some other implementations, computing environment 100 may not have all of these components or systems, or may have other components or systems instead of, or in addition to, those listed above.

Multi-tenant database system 110 may include one or more databases that have a multitenant architecture capable of storing data for one or more tenants. A tenant may be a particular organizational entity (e.g., company, division, department) or group of users (e.g., organization's employees). Multi-tenant database system 110 may enable client computing devices 140A-Z to access executable programs (e.g., applications) or data from a network source that appears to be centralized but might be distributed for backup, redundancy and/or performance reasons. An example of a multi-tenant database system may be a computing system that is accessible to multiple independent parties and provides those parties with application execution, data storage, or a combination thereof. Where there is an appearance of centralization, and network access, each subscribing party (e.g., a "tenant") can access the system to perform application functions, including manipulating that tenant's data. The term "multi-tenant database system" may refer to systems in which various elements of hardware and software of a database system may be shared by one or more customers or tenants. For example, a given application server may simultaneously process requests for a great number of customers, and a given database table may store rows of data such as feed items for a potentially much greater number of customers.

Multi-tenant database system 110 may be based on a relational database model and may include a layer of abstraction over a modified relational database schema that provides an appearance of different schemas to different tenants without requiring the overhead of maintaining multiple separate schemas. The layer of abstraction that provides the appearance of different schemas is discussed in more detail below in regards to FIGS. 4A and 4B. The underlying relational database model may involve a relational database management system (RDBMS) or similar executable program that manages the underlying data structures and provides access for reading and modifying the underlying database (e.g., database objects). The relational database management system may provide internal features such as system cataloging, caching mechanisms, query optimization, application development features, other database features, or a combination thereof.

The underlying database schema may refer to the arrangement of data and may function as a blueprint of how a particular tenant portion of the database is constructed. The database schema may include a set of formulas representing integrity constraints imposed on the tenant portion of the database. The integrity constraints enable the database management system to provide compatibility between different parts of the schema. In one example, a database schema may define the tables, fields, relationships, views, indexes, packages, procedures, functions, queues, triggers, types, sequences, materialized views, synonyms, database links, directories, other database elements, or a combination thereof. The schemas for the different tenants may be stored in one or more data dictionaries accessible to the database management system.

Multi-tenant database system 110 may be implemented as part of a single database, a distributed database, a collection of distributed databases, a database with redundant online or offline backups or other redundancies, etc., and can include a distributed database or storage network and associated processing intelligence. In the example shown in FIG. 1, multi-tenant database system 110 may include one or more nodes 112A-C, which may include tenant data 114A-C, log data 116A-C, or a combination thereof.

Nodes 112A-C may represent separate computing devices that are physically or logically coupled with one another to support multi-tenant database system 110. Nodes 112A-C may each be a server and the term "server" may refer to a system that includes processing hardware and process space (s), an associated storage medium such as a memory device or database, and, in some instances, a database application (e.g., RDBMS) as is well known in the art. It should also be understood that "server system" and "server" are often used interchangeably herein.

Tenant data 114A-C may be data stored by the database and may be stored as one or more database objects. The database objects may include database records, database schemas, other objects, or a combination thereof. Tenant data 114 may be executable data, textual data, audio data, video data, other data, or a combination thereof. In one example, multi-tenant database system 110 may include tenant data for multiple tenants stored on the same physical device (e.g., a single node 112A). Therefore, tenant data 114A may include data from multiple different tenants. In another example, multi-tenant database system 110 may separate tenant data for different tenants on different physical devices (e.g., different nodes). In which case, tenant data 114A may correspond to a first tenant (e.g., organization A) and tenant data 114B may correspond to a second tenant (e.g., organization B). In a further example, tenant data 114A may include data from multiple tenants and a single tenant may correspond to data on multiple different nodes. In these examples, tenant data for different tenants are kept logically separate whether or not they are stored on the same or different physical devices to ensure that one tenant does not have access to another tenant's data, unless such data is expressly shared.

Log data 116A-C may be data indicating activity of multi-tenant database system 110. The activity may involve interactions with one or more database objects and may include accesses, modifications, other actions, or a combination thereof. Log data 116 may refer to one or more log data structures that record and organize the logged data for subsequent access. Log data 116 may be used for database recovery (e.g., backup, archiving), diagnostics (e.g., performance, errors), duplication (e.g., synchronization, migration), other purposes, or a combination thereof. A log data structure may include one or more files (e.g., log files), databases (e.g., log databases), other logging data structure, or a combination thereof. In one example, log data 116A-C may correspond to one or more pre-allocated files that store all changes made to the database as they occur. Each instance of a database may be associated with a log data structure to protect the database in case of an instance failure.

Each log data structure may correspond to a particular duration of time, a particular portion of the multi-tenant database, or a combination thereof. In one example, each log data structure may correspond to activity that occurred during a particular duration of time and the beginning and end of the changes may be dictated by a particular time or a particular size. For example, a first log data structure may store activity until a particular time or size is exceeded. At which point, another log data structure may be selected or generated to store subsequent activity. This may result in a set of log data structures that are populated consecutively and are arranged as a log sequence that represents the activity of the multi-tenant database. The set of log data structures may be stored on a particular computing device or multiple different computing devices. In the example shown in FIG. 1, each of the nodes 112A-C may include log data 116A-C. In other examples, the log data may only be stored on one of the nodes or on a separate computing device that does not store a portion of the database or execute the database management software. In either example, log data 116A-C may store instances of activity as one or more change events 122.

Change events 122 may be individual entries that are included within the log data structure and may represent instances of database activity (e.g., record update, trigger firing, schema update, object creation). A change event may also be referred to as a "write ahead entry" or "write ahead record" and may be made up of one or more change vectors. A change vector may include a description of a change made to an aspect (e.g., a single block, row, column, table) of the database. For example, when a value of a particular field of a table is modified the multi-tenant database system 110 may initiate the generation of a change event that contains one or more change vectors that describe: changes to the data segment block for the table, the undo segment data block, the transaction table of the undo segments, other change, or a combination thereof. In one example, each of the change events 122 may be an individual entry that is separate from a previous and subsequent change event. In another example, one or more of the change events may be associated (e.g., linked) with one or more other change events.

In one example, the log data structure may be a write ahead log file with write ahead entries. Write ahead entries may record data that you can use to reconstruct all changes made to the database including the undo segments. The write ahead entry may be made up of a group of change vectors, each of which is a description of a change made to a single block in the database. For example, if you change a salary value in an employee table, a write ahead record may be generated that contains change vectors that describe changes to the data segment block for the table, the undo segment data block, and the transaction table of the undo segments. The write ahead log may store this information and therefore protect rollback data. When multi-tenant database system 110 needs to perform a recovery it may access the change vectors in the write ahead entries and apply the changes to the relevant portions of the database. In one example, the write ahead log may be referred to as a redo log and the write ahead entries may be referred to as redo entries or redo records.

The write ahead entries may be buffered in a circular fashion in a write ahead log buffer and may be written to one of the write ahead log files by a log writing feature of the multi-tenant database system 110, which may be running as a background or foreground process. When a transaction is committed, the log writing feature may write the transaction write ahead entry (e.g., record) from the write ahead log buffer to a write ahead log file and may assign a system change number (SCN) to identify the write ahead records for each committed transaction. Only when all write ahead records associated with a given transaction are safely on disk in an online log is the transaction considered committed. Write ahead records may be written to a write ahead log file before the corresponding transaction is committed. If the write ahead log buffer fills, or another transaction commits, the log writing features may flush all of the write ahead log entries in the write ahead log buffer to a write ahead log file, even though some write ahead records may not be committed. This may enable the database to roll back these changes if a failure occurs.

Multi-tenant database system 110 may be provided as a part of a Platform-as-a-Service (PaaS) and may enable on-demand database service that store information from one or more tenants into tables of a common database image. A platform-as-a-service may be a category of cloud computing services that provides a platform allowing customers to develop, run, and manage applications without the complexity of building and maintaining the infrastructure typically associated with developing and launching an app. A platform-as-a-service may be delivered as a public cloud service or as a private service. The public service may be provided by a third party and the consumer may control software deployment with minimal configuration options, and the third party may provide the networks, servers, storage, OS, middleware (e.g. Java runtime, .NET runtime, integration, etc.), database and other services to host the consumer's application. The private service may be implemented by software or an appliance inside the firewall of the consumer (e.g., organizational client). With a multi-tenant system, the tenants have the advantage that they need not install software, maintain backups, move data to laptops to provide portability, etc. Rather, each tenant user need only be able to access the multi-tenant system to operate the applications and access that tenant's data. One such system usable for customer relationship management is the multi-tenant system accessible to salesforce.com subscribers. With such systems, a client device need only have network connectivity and a network client (e.g., browser, HTTP client, or other suitable Internet client). Multi-tenant database system 110 is discussed in more detail in regards to FIGS. 4A and 4B.

Computing device 130 may be a single machine or multiple machines arranged in a cluster and may include a rackmount computing device, a standalone computing device, a workstation, a desktop computer, a notebook computer, a tablet computer, a mobile phone, a palm-sized computing device, a personal digital assistant (PDA), etc. In one example, computer device 130 may be a computing device implemented with x86 hardware. In another example, computer device 130 may be a computing device implemented with PowerPC®, SPARC®, or other hardware. In the example shown in FIG. 1, computing device 130 may function as a server and may be separate from the multi-tenant database system 110. In other examples, computing device 130 may be a part of the multi-tenant database system 110 and may function as one or more of the nodes 112A-C. In either example, computing device 130 may include a change tracking initiation component 132, a parallel processing component 134, and an event providing component 136.

Change tracking initiation component 132 may initiate change tracking on a portion of the multi-tenant database system 110. Change tracking initiation component 132 may receive a request 133 from one of computing devices 140A-Z. Request 133 may identify a portion of a database and/or a portion of time. The portion of the database (e.g., any subset of the database) may correspond to a particular tenant of a multi-tenant database. A tenant may be a particular organizational entity (e.g., company) or group of users (e.g., organization's employees). The portion of the database associated with the tenant may be identified by an organizational identifier that corresponds to the tenant. Once the tracking is initiated, computing device 130 may process log data 116A-C using parallel processing component 134.

Parallel processing component 134 may provide features for retrieving and analyzing log data 116A-C to identify activity that has occurred or is occurring on multi-tenant database system 110. Parallel processing component 134 may retrieve change events 122 stored within log data 116A-C and may store the change events within persistent data store 120. Parallel processing component 134 may create a set of change events that are ordered based on one or more criteria. In one example, the set may be chronologically ordered based on change identifiers.

Event providing component 136 may provide the ordered set to one or more computing devices. The computing device that receives the ordered set may be the same computing device that requested the change tracking or it may be another computing device. In a data migration scenario (e.g., tenant data migration), for example, a first computing device may request that changes be tracked and sent to a second computing device. The second computing device may be a destination device (e.g., target device) for the migration and may apply the tracked changes to produce a multi-tenant database system that includes the portion of the multi-tenant database.

Persistent data store 120 may be any data storage device or a combination of data storage devices that are capable of storing change events 122. Persistent data store 120 may be a distributed storage system for storing and managing structured data in a manner that provides dynamic control over data layout and format. In the example shown in FIG. 1, the change events 122 stored in persistent data store 120 may be the same (e.g., identical copy) or similar (e.g., a portion of an identical copy) to the change events of log data 116A-C. In another example, change events 122 stored within persistent data store 120 may be different from the change events of log data 116A-C. For example, the change events of log data 116A-C may be stored in a binary format (e.g., binary objects) that may be resolved to another format (e.g., textual format) using one or more data dictionaries.

Persistent data store 120 may be separate from multi-tenant database system and may utilize different data storage technology. For example, multi-tenant database system may be a relational database system that uses tabular relations and persistent data store 120 may be a non-relational data store without tabular relations. Multi-tenant database system 110 may provide access to data using a standard query language (SQL) and persistent data store 120 may provide access to data using an interface (e.g., API) without supporting a standard query language.

Computing devices 140A-Z may function as client devices and may include desktop computers, laptop computers, mobile phones, tablet computers, other computing devices, or a combination thereof. In some implementations, computing devices 140A-Z may be referred to as a "user devices," "client devices," "computer devices," "server devices" other variation, or a combination thereof. In the example shown in FIG. 1, computing devices 140A-Z are separate from the multi-tenant database system 110. In other examples, computing devices 140A-Z may be included within the multi-tenant database system 110 (e.g., node 112A) or may be a part of computing device 130.

Network 150 may be or include any network or combination of networks of systems or devices that communicate with one another. For example, the network 150 can be or include any one or any combination of a LAN (local area network), WAN (wide area network), telephone network, wireless network, cellular network, point-to-point network, star network, token ring network, hub network, or other appropriate configuration. The network 150 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

Figure 2:
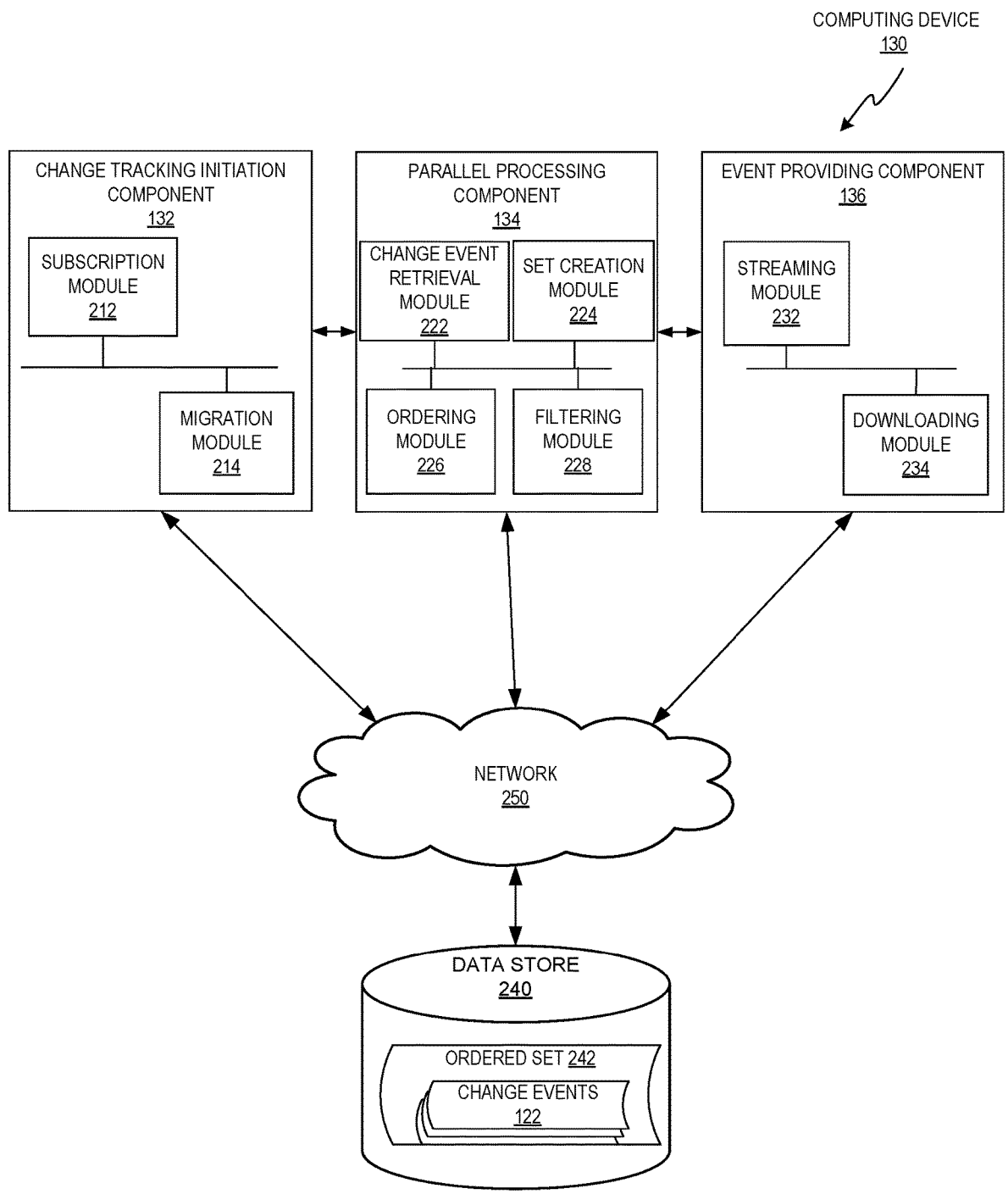
FIG. 2 shows a block diagram of example implementations of components of FIG. 1 and example interconnections between the components according to some implementations.

FIG. 2 depicts a block diagram illustrating an exemplary computing device 130 that includes database change tracking technology, in accordance with aspects of the disclosure. Computing device 130 may be the same or similar to computing device 130 of FIG. 1 and may include a change tracking initiation component 132, a parallel processing component 134, an event providing component 136, and a data store 240. More or less components or modules may be included without loss of generality. For example, two or more of the components may be combined into a single component, or features of a component may be divided into two or more components. In one implementation, one or more of features of a component may be executed on different computing devices (e.g., a client device and a server device).

Change tracking initiation component 132 may initiate change tracking for a portion of the multi-tenant database system 110. In one example, change tracking initiation component 132 may include a subscription module 212 and a migration module 214. Subscription module 212 may enable computing device 130 to receive a request from a client device to subscribe to changes of a particular portion of a multi-tenant database. The client device may be from a tenant that is associated with the portion of the multi-tenant database and the request may subscribe the client device or other device to the changes.

Migration module 214 may initiate a migration of the portion of the multi-tenant database to another location. Migration module 214 may use subscription module 212 to cause the changes to be tracked and sent to a destination server. If more than one multi-database is used, the databases may be located in close proximity to one another (e.g., server farm in a single building or campus) or they may be distributed at locations that are remote from one another (e.g., servers located in different cities). As used herein, each multi-database may include one or more logically or physically connected servers distributed locally or across one or more geographic locations.

Parallel processing component 134 may provide features for retrieving and analyzing log data that represents activity that has occurred, is occurring, or will occur on the multi-tenant database. In one example, parallel processing component 134 may include a change event retrieval module 222, a set creation module 224, an ordering module 226, and a filtering module 228.

Change event retrieval module 222 may enable computing device 130 to access the change events stored in one or more logs corresponding to the multi-tenant database. The logs may be accessed directly by analyzing the log data structures (e.g., log files) or may be accessed indirectly by interfacing with a log reader provided by the database manufacturer. The log reader (e.g., log miner) may include an interface to request change events from the log data structure. The interface may support a query interface, command line interface, a programming interface, other interface, or a combination thereof. The query interface may support a database query language, information retrieval query language, other query language, or a combination thereof. For example, query interface may support a standard query language (SQL). The programming calls may support any language such as Java®, C, C++, Perl, other language, or a combination thereof.

Change event retrieval module 222 may retrieve change events from multiple different logs on one or more devices in parallel, serially, or a combination thereof. Retrieving the change events from the log data structure may involve requesting the log data (e.g., querying) and subsequently receiving the change events. The change events may be written to the log data structure in a chronological order but may be retrieved or received in a non-chronological order. For example, the log data structures may be created sequentially and as one is filled another log data structure may be created so that the change events are written as a chronological stream across multiple consecutive logs. When these logs are accessed they may be accessed in parallel and therefore the change events may be received as separate streams with change events that are out of chronological order. In one example, the change events for a particular log data structure may be accessed and transmitted in a reverse chronological order (last-in-first-out (LIFO)), other order, or a combination thereof. In another example, the change events for a particular log data structure may be accessed and transmitted in chronological order (e.g., first-in-first-out (FIFO)) but because change event retrieval module 222 receives multiple streams derived from different log data structures they may be received and processed out of order.

Change event retrieval module 222 may store the received change events in a persistent data store. The persistent data store may be any data storage device or a combination of data storage devices that are capable of storing change events. Persistent data store 120 may be a storage system for storing and managing structured data in a manner that provides dynamic control over data layout and format. Persistent data store 120 may be separate from multi-tenant database system and may utilize different data storage technology.

Set creation module 224 may access the change events from the persistent data store and organize them into one or more ordered sets 242. An ordered set 242 may be a data structure that is associated with one or more change events derived from log data of the multi-tenant database system. The data structure may include log data in the form of one or more change events, change event data, or links to change events. In one example, the change events associated with the ordered set 242 may be the same (e.g., identical copy) as the change events that are within the log or within the persistent data store. In another example, the change events associated with ordered set 242 may be different from the change events within the log or within the persistent data store. For example, the change events in the log may be stored in a binary format and may be resolved to another format (e.g., textual format) which may be the format of the change events associated with the ordered set 242.

Ordering module 226 may arrange the change events of ordered set 242 in any order. The order may be based on change identification data (e.g., change identifier), time data (e.g., time stamp), device data (e.g., device name), entity data (e.g., organization identifier), size data (e.g., delta size), other data, or a combination thereof. The change identification data may include a change identifier that uniquely identifies each change event. The change identifier may include one or more, numeric values, alph-numeric values, character values, binary values, other values, or a combination thereof. The value of multiple change identifiers may be related to one another and may indicate a particular sequence. The relationship may be based on increasing values, decreasing values, other relationship, or a combination thereof. In one example, the change identifier may be or include a system change number (SCN) that is a monotonically increasing numeric value. The change identifier may be created and assigned by the multi-tenant database before, during, or after an occurrence of a change to the portion of the multi-tenant database.

Ordering module 226 may include committed change events, uncommitted change events, or a combination thereof within ordered set 242. Uncommitted change events may represent activity that occurred on the database but was not committed to the database. In one example, that may occur because an operation may have been executed and modified data that resided in memory but the modified memory may not have been applied (e.g., persisted, flushed) to a persistent copy of the database. In another example, an uncommitted change may occur when processing a transaction that includes multiple operations because some of the operations may execute but one or more of the remaining operations may fail. Therefore, the transaction as a whole may fail and may not be committed. In either example, the failure may arise due to a user or system action (e.g., rollback), a system failure (e.g., power failure, network failure, computing device failure), a configuration failure (e.g., permission, resource availability), other software or hardware failure, or a combination thereof.

Filtering module 228 may filter change events of ordered set 242 and provide the filtered change events to event providing component 136. In one example, the filtering module 228 may filter the change events accessed by event providing component 136 without modifying the ordered set 242. In another example, the filtering module 228 may filter the change events by modifying the ordered set 242. In either example, the filtering may be based on any data stored within data store 240 and may include filtering the change events based on tenants, tables, operations, other data, or a combination thereof. Filtering module 228 may be integrated with or separate from event providing component 136.

Event providing component 136 may provide the filtered or non-filtered ordered set of change events to one or more computing devices. The change events may be provided to the computing device that requested the tracked changes or may be provided to a different computing device, such as a device (e.g., target device or destination device) identified by the request. In one example, event providing component 136 may include a streaming module 232 or a downloading module 234. Streaming module 232 may stream the ordered set of change events to the computing device. The stream may be a sequence, a feed, or a pipeline of change events made available over a network. The stream may be transmitted from computing device 130 and received by the other computing device. Downloading module 234 may provide the set of change events as individual change events or as batched change events using a push or pull mechanism. A push mechanism may involve the computing device 130 initiating a transfer of the change events when the change events are available. A pull mechanism may involve the computing device waiting for a transfer initiated by a client computing device, at which point the change events (if any) may be transmitted to the client computing device.

The components and modules discussed above may be used to migrate a portion (e.g., a subset) of a multi-tenant database. The term migration may be a broad term that encompasses reproducing a portion of a source database at a destination database. The reproduction may involve duplicating, copying, or synchronizing one or more change events and may or may not involve updating the source database to remove the portion that was reproduced. The migration may involve retrieving and processing change events of the source database from log data as discussed above in regards to parallel processing component 134. The migration may also involve providing the change events to the computing device associated with the destination database as discussed above in regards to event providing component 136. The database management system of the destination database may then apply the change events to reproduce the portion of the database at the destination database.

The migration may also involve an access restriction component (not shown) that may handle restricting access and providing access to the databases that are affected by the migration. Access restriction component may restrict or provide access before, during, or after the migration has completed and may affect the source database, destination database, other database, or a combination thereof. In one example, access restriction component may restrict the portion of the source database that is being migrated after the portion is reproduced at the target database. This may be done before, during or after providing access to the corresponding portion on the target database.

Figure 3:
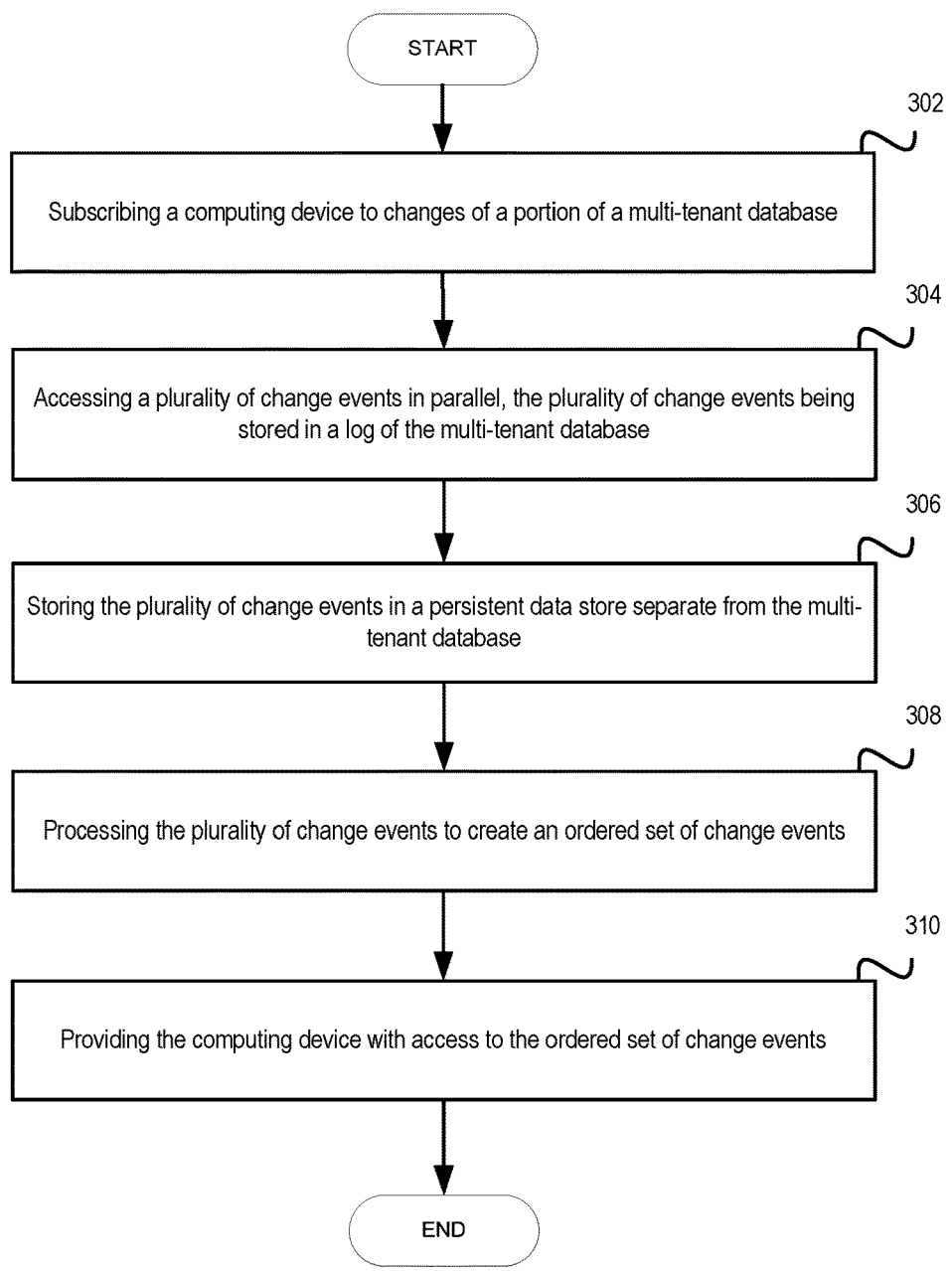
FIG. 3 is a flow diagram illustrating an exemplary operation of change tracking, according to some implementations.

FIG. 3 depicts a flow diagram of example method 300 for change tracking that uses parallel processing in accordance with an aspect of the invention. Method 300 may be performed by processing devices that may comprise hardware (e.g., circuitry, dedicated logic), software (such as is run on a general purpose computer system or a dedicated machine), or a combination of both. Method 300 and each of its individual functions, routines, subroutines, or operations may be performed by one or more processors of the computer device executing the method. In certain implementations, method 300 may each be performed by a single processing device. Alternatively, method 300 may be performed by two or more processing devices, each processing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 may be performed by computing device 130 of FIGS. 1 and 2.

Method 300 may be performed by processing devices of a server device or a client device and may begin at block 302. At block 302, a processing device may subscribe a computing device to changes of a portion of a multi-tenant database. The portion of the multi-tenant database may correspond to only a subset of the records stored by the multi-tenant database. In one example, the multi-tenant database may include data associated with multiple different organizational identifiers and the portion of the multi-tenant database may correspond to a particular tenant represented by one of the organization identifiers.

At block 304, the processing device may access a plurality of change events in parallel, wherein the plurality of change events are stored in a log of the multi-tenant database. The log may include a plurality of write ahead log files for the multi-tenant database and the change events may be write ahead records with change vectors of the multi-tenant database. The plurality of logs may include a first log for a first time period (e.g., 12 am-8 am) and a second log for a second time period (e.g., 8 am-4 pm).

Accessing the log for the multi-tenant database may involve determining an identifier that corresponds to the portion of the multi-tenant database and submitting a query for change events for the portion of the multi-tenant database. The query may include the identifier and may cause the subsequent receipt of the plurality of change events. In one example, the multi-tenant database may include a plurality of nodes and wherein accessing the log comprises accessing a plurality of logs on the plurality of nodes of the multi-tenant database. The plurality of logs may include a first log that corresponds to a first node of the multi-tenant database and a second log that corresponds to a second node of the multi-tenant database.

At block 306, the processing device may store the plurality of change events in a persistent data store separate from the multi-tenant database. The plurality of change events may be from one or more logs and the processing device may store the change events in parallel or serially into the persistent data store. The persistent data store may be any data storage device or a combination of data storage devices that are capable of storing change events. The persistent data store may be a storage system for storing and managing structured data in a manner that provides dynamic control over data layout and format. The persistent data store may be separate from multi-tenant database system and may utilize different data storage technology. In one example, the multi-tenant database may be a relational database with tabular relations and the persistent data store may be a non-relational distributed data store without tabular relations. The multi-tenant database may enable access to data using a standard query language (SQL) and the persistent datastore may enable access to data using an interface (e.g., API) without supporting a standard query language.

At block 308, the processing device may process the plurality of change events to create an ordered set of change events. Processing the plurality of change events may occur serially or in parallel and may involve processing the plurality of change events in a non-chronological order and adding them to the ordered set of change events. Each change event of the ordered set of change events may include a change identifier and the change events of the ordered set may be sorted in view of the change identifier. The change identifier may be a monotonically increasing numeric value assigned by the multi-tenant database in response to an occurrence of a change to the portion of the multi-tenant database. In one example, the change events may include committed change events and uncommitted change events of the multi-tenant database, and the ordered set may include each of the committed change events without including any of the uncommitted change events. In one example, this may occur because only the committed events are added to the set. In another example, both committed and uncommitted change events are added but the uncommitted change events are subsequently removed (e.g., filtered out).

At block 310, the processing device may provide the computing device with access to the ordered set of change events. Providing the computing device with access to the ordered set of change events may involve streaming the change events in a chronological order. Responsive to completing the functions of block 310, method 300 may terminate In other examples of method 300, the processing device may perform the above steps to perform a migration of the portion of the multi-tenant database to a different database on the same device or on a different device. The different devices may be at the same geographic location or at different geographic locations. For example, the migration may cause the portion of the multi-tenant database from a first geographic location to be moved to a multi-tenant database at a second geographic location. The client request to migrate the portion of the multi-tenant may cause the portion of the multi-tenant database to be copied without copying a remaining portion of the multi-tenant database.

When method 300 is used to perform a migration, method 300 may also involve receiving a client request to copy the portion of the multi-tenant database to the computing device. The processing device may include a database and may stream the ordered set of change events to the computing device. The processing device may cause the ordered set of change events to be applied to the database on the computing device. During any part of the method, the processing device may restrict access to the portion of the multi-tenant database and provide access to the portion of the database on the computing device that corresponds to the portion of the multi-tenant database.

Figure 4A:
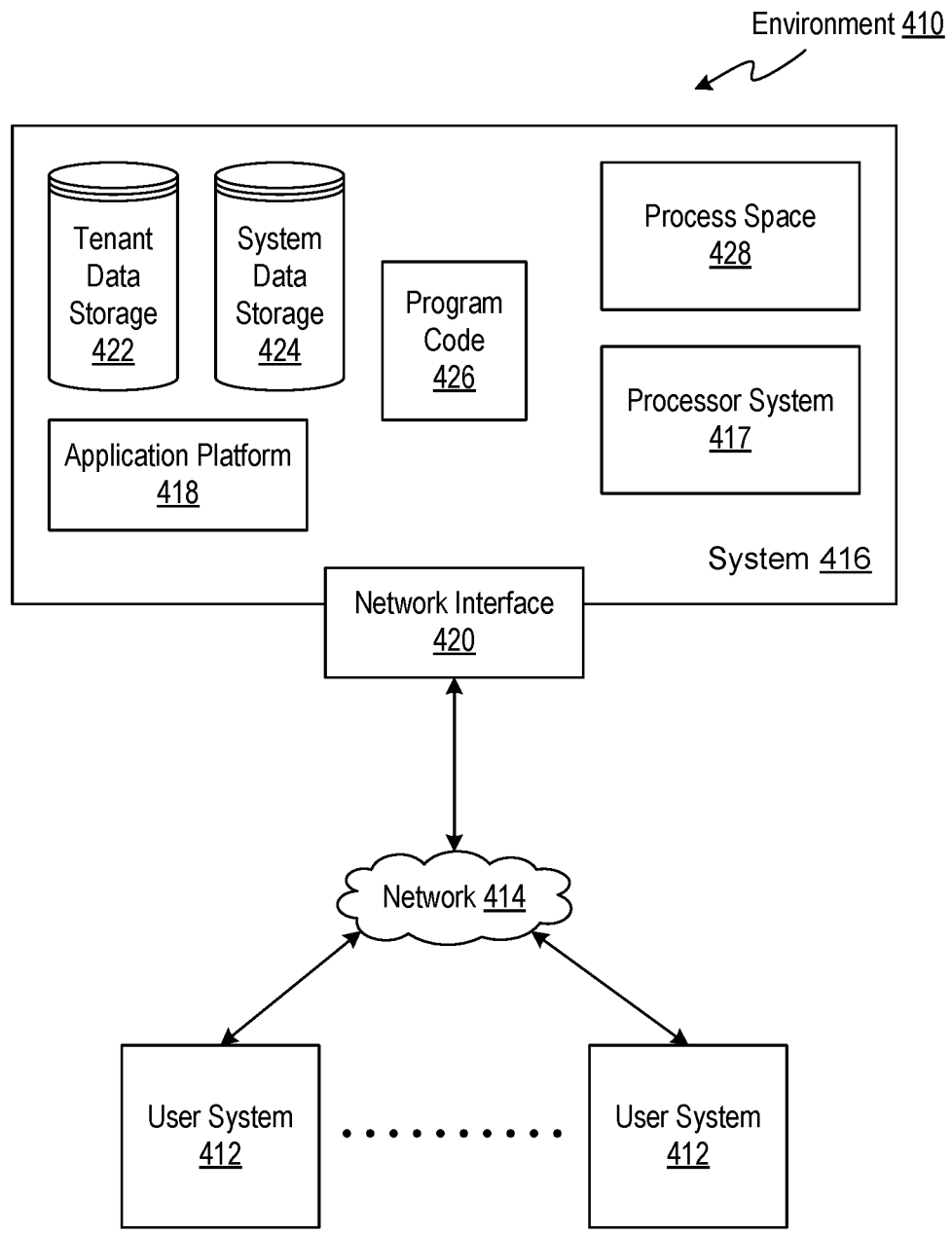
FIG. 4A shows a block diagram of an example environment in which an on-demand database service can be used according to some implementations.

FIG. 4A shows a block diagram of an example of an environment 410 in which an on-demand database service can be used in accordance with some implementations. The environment 410 includes user systems 412, a network 414, a database system 416 (also referred to herein as a "cloud-based system"), a processor system 417, an application platform 418, a network interface 420, tenant database 422 for storing tenant data 423, system database 424 for storing system data 425, program code 426 for implementing various functions of the system 416, and process space 428 for executing database system processes and tenant-specific processes, such as running applications as part of an application hosting service. In some other implementations, environment 410 may not have all of these components or systems, or may have other components or systems instead of, or in addition to, those listed above.

In some implementations, the environment 410 is an environment in which an on-demand database service exists. An on-demand database service, such as that which can be implemented using the system 416, is a service that is made available to users outside of the enterprise(s) that own, maintain or provide access to the system 416. As described above, such users generally do not need to be concerned with building or maintaining the system 416. Instead, resources provided by the system 416 may be available for such users' use when the users need services provided by the system 416; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 418 can be a framework that allows the applications of system 416 to execute, such as the hardware or software infrastructure of the system 416. In some implementations, the application platform 418 enables the creation, management, and execution of one or more applications developed by the provider of the on-demand database service, users accessing the on-demand database service via user systems 412, or third party application developers accessing the on-demand database service via user systems 412.

In some implementations, the system 416 implements a web-based customer relationship management (CRM) system. For example, in some such implementations, the system 416 includes application servers configured to implement and execute CRM software applications as well as provide related data, code, forms, renderable web pages and documents and other information to and from user systems 412 and to store to, and retrieve from, a database system related data, objects, and Web page content. In some MTS implementations, data for multiple tenants may be stored in the same physical database object in tenant database 422. In some such implementations, tenant data is arranged in the storage medium(s) of tenant database 422 so that data of one tenant is kept logically separate from that of other tenants so that one tenant does not have access to another tenant's data, unless such data is expressly shared. The system 416 also implements applications other than, or in addition to, a CRM application. For example, the system 416 can provide tenant access to multiple hosted (standard and custom) applications, including a CRM application. User (or third party developer) applications, which may or may not include CRM, may be supported by the application platform 418. The application platform 418 manages the creation and storage of the applications into one or more database objects and the execution of the applications in one or more virtual machines in the process space of the system 416.

According to some implementations, each system 416 is configured to provide web pages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 414 can be or include any network or combination of networks of systems or devices that communicate with one another. For example, the network 414 can be or include any one or any combination of a LAN (local area network), WAN (wide area network), telephone network, wireless network, cellular network, point-to-point network, star network, token ring network, hub network, or other appropriate configuration. The network 414 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 412 can communicate with system 416 using TCP/IP and, at a higher network level, other common Internet protocols to communicate, such as HTTP, FTP, AFS, WAP, etc. In an example where HTTP is used, each user system 412 can include an HTTP client commonly referred to as a "web browser" or simply a "browser" for sending and receiving HTTP signals to and from an HTTP server of the system 416. Such an HTTP server can be implemented as the sole network interface 420 between the system 416 and the network 414, but other techniques can be used in addition to or instead of these techniques. In some implementations, the network interface 420 between the system 416 and the network 414 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 412 can be implemented as any computing device(s) or other data processing apparatus or systems usable by users to access the database system 416. For example, any of user systems 412 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 412 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 416) of the user system 412 to access, process and view information, pages and applications available to it from the system 416 over the network 414.

Each user system 412 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 412 in conjunction with pages, forms, applications and other information provided by the system 416 or other systems or servers. For example, the user interface device can be used to access data and applications hosted by system 416, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 412 may differ in their respective capacities, and the capacity of a particular user system 412 can be entirely determined by permissions (permission levels) for the current user of such user system. For example, where a salesperson is using a particular user system 412 to interact with the system 416, that user system can have the capacities allotted to the salesperson. However, while an administrator is using that user system 412 to interact with the system 416, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 412 and some or all of its components are operator-configurable using applications, such as a browser, including computer code executed using a central processing unit (CPU) such as an Intel Pentium® processor or the like. Similarly, the system 416 (and additional instances of an MTS, where more than one is present) and all of its components can be operator-configurable using application(s) including computer code to run using the processor system 417, which may be implemented to include a CPU, which may include an Intel Pentium® processor or the like, or multiple CPUs.

The system 416 includes tangible computer-readable media having non-transitory instructions stored thereon/in that are executable by or used to program a server or other computing system (or collection of such servers or computing systems) to perform some of the implementation of processes described herein. For example, computer program code 426 can implement instructions for operating and configuring the system 416 to intercommunicate and to process web pages, applications and other data and media content as described herein. In some implementations, the computer code 426 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Oracle Corp.).

Figure 4B:
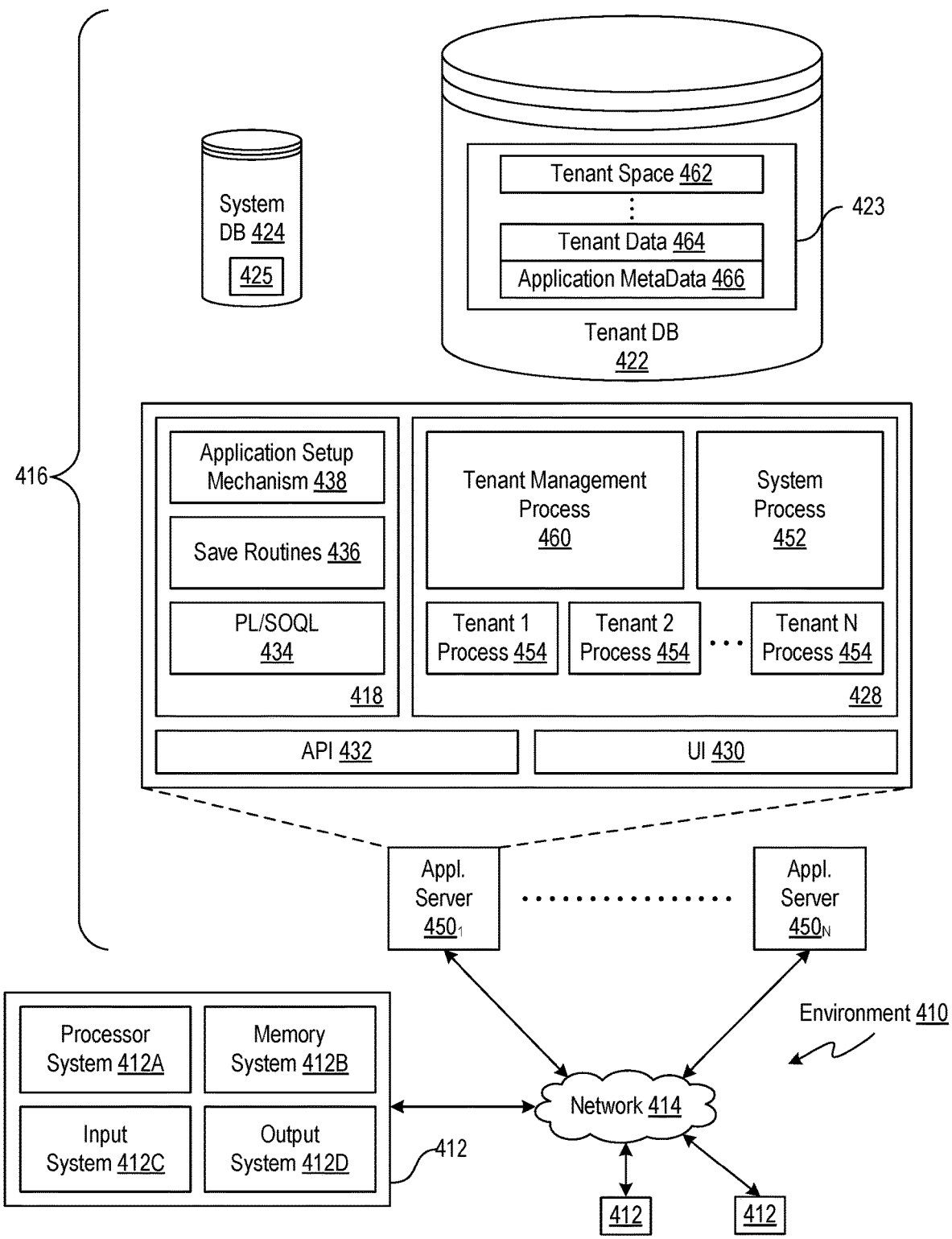
FIG. 4B shows a block diagram of example implementations of elements of FIG. 4A and example interconnections between these elements according to some implementations.

FIG. 4B shows a block diagram of example implementations of elements of FIG. 4A and example interconnections between these elements according to some implementations. That is, FIG. 4B also illustrates environment 410, but FIG. 4B, various elements of the system 416 and various interconnections between such elements are shown with more specificity according to some more specific implementations. Additionally, in FIG. 4B, the user system 412 includes a processor system 412A, a memory system 412B, an input system 412C, and an output system 412D. The processor system 412A can include any suitable combination of one or more processors. The memory system 412B can include any suitable combination of one or more memory devices. The input system 412C can include any suitable combination of input devices, such as one or more touchscreen interfaces, keyboards, mice, trackballs, scanners, cameras, or interfaces to networks. The output system 412D can include any suitable combination of output devices, such as one or more display devices, printers, or interfaces to networks.

In FIG. 4B, the network interface 420 is implemented as a set of HTTP application servers $450_1$-$450_N$. Each application server 450, also referred to herein as an "app server", is configured to communicate with tenant database 422 and the tenant data 423 therein, as well as system database 424 and the system data 425 therein, to serve requests received from the user systems 412. The tenant data 423 can be divided into individual tenant storage spaces 462, which can be physically or logically arranged or divided. Within each tenant storage space 462, user storage 464 and application metadata 466 can similarly be allocated for each user. For example, a copy of a user's most recently used (MRU) items can be stored to user storage 464. Similarly, a copy of MRU items for an entire organization that is a tenant can be stored to tenant storage space 462.

The process space 428 includes system process space 452, individual tenant process spaces 454, and a tenant management process space 460. The application platform 418 includes an application setup mechanism 438 that supports application developers' creation and management of applications. Such applications and others can be saved as metadata into tenant database 422 by save routines 436 for execution by subscribers as one or more tenant process spaces 454 managed by tenant management process 460, for example. Invocations to such applications can be coded using PL/SoQL 434, which provides a programming language style interface extension to API 432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 466 for the subscriber making the invocation and executing the metadata as an application in a virtual machine.

The system 416 of FIG. 4 also includes a user interface (UI) 430 and an application programming interface (API) 432 to system 416 resident processes to users or developers at user systems 412. In some other implementations, the environment 410 may not have the same elements as those listed above or may have other elements instead of, or in addition to, those listed above.

Each application server 450 can be communicably coupled with tenant database 422 and system database 424, for example, having access to tenant data 423 and system data 425, respectively, via a different network connection. For example, one application server $450_1$ can be coupled via the network 414 (for example, the Internet), another application server $450_{N-1}$ can be coupled via a direct network link, and another application server $450_N$ can be coupled by yet a different network connection. Transfer Control Protocol and Internet Protocol (TCP/IP) are examples of typical protocols that can be used for communicating between application servers 450 and the system 416. However, it will be apparent to one skilled in the art that other transport protocols can be used to optimize the system 416 depending on the network interconnections used.

In some implementations, each application server 450 is configured to handle requests for any user associated with any organization that is a tenant of the system 416. Because it can be desirable to be able to add and remove application servers 450 from the server pool at any time and for various reasons, in some implementations there is no server affinity for a user or organization to a specific application server 450. In some such implementations, an interface system implementing a load balancing function (for example, an F5 Big-IP load balancer) is communicably coupled between the application servers 450 and the user systems 412 to distribute requests to the application servers 450. In one implementation, the load balancer uses a least-connections algorithm to route user requests to the application servers 450. Other examples of load balancing algorithms, such as round robin and observed-response-time, also can be used. For example, in some instances, three consecutive requests from the same user could hit three different application servers 450, and three requests from different users could hit the same application server 450. In this manner, by way of example, system 416 can be a multi-tenant system in which system 416 handles storage of, and access to, different objects, data and applications across disparate users and organizations.

In one example storage use case, one tenant can be a company that employs a sales force where each salesperson uses system 416 to manage aspects of their sales. A user can maintain contact data, leads data, customer follow-up data, performance data, goals and progress data, etc., all applicable to that user's personal sales process (for example, in tenant database 422). In an example of a MTS arrangement, because all of the data and the applications to access, view, modify, report, transmit, calculate, etc., can be maintained and accessed by a user system 412 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 416 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 416 also can maintain system level data usable by multiple tenants or other data. Such system level data can include industry reports, news, postings, and the like that are sharable among tenants.

In some implementations, the user systems 412 (which also can be client systems) communicate with the application servers 450 to request and update system-level and tenant-level data from the system 416. Such requests and updates can involve sending one or more queries to tenant database 422 or system database 424. The system 416 (for example, an application server 450 in the system 416) can automatically generate one or more SQL statements (for example, one or more SQL queries) designed to access the desired information. System database 424 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 5:
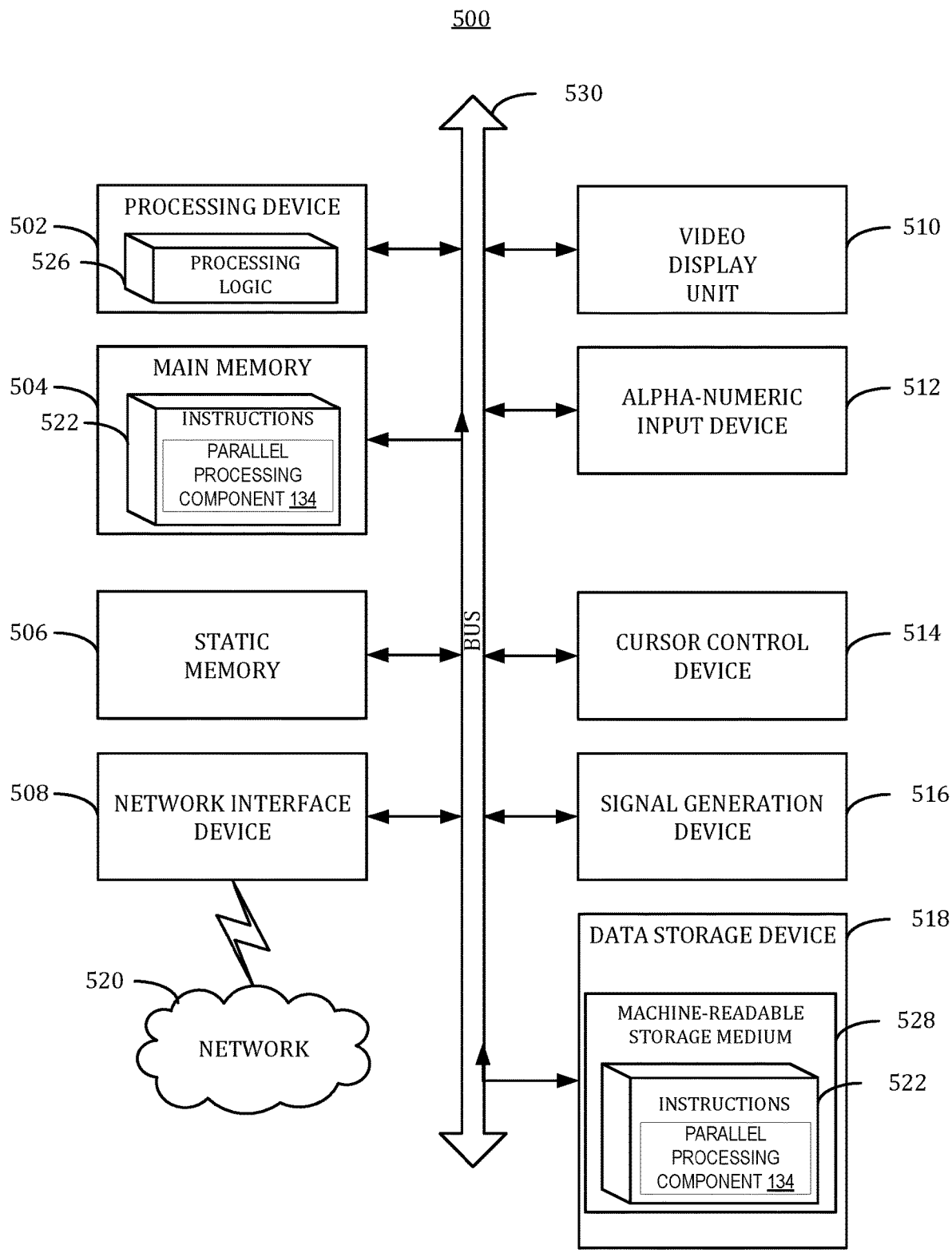
FIG. 5 is a diagrammatic representation of a machine in the exemplary form of a computer system configured to perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 may be comprised of a processing device 502, a main memory 504 (e.g., read-only memory (ROM), flash memory, dynamic random access memory (DRAM) (such as synchronous DRAM (SDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute processing logic 526 for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 528 having one or more sets of instructions 522 (e.g., software) embodying any one or more of the methodologies or functions described herein. Instructions 522 may also reside, completely or at least partially, within main memory 504 and/or within processing device 502 during execution thereof by computer system 500; main memory 504 and processing device 502 also constituting machine-readable storage media. Instructions 522 may further be transmitted or received over a network 520 via network interface device 508.

Machine-readable storage medium 528 (e.g., computer-readable storage medium) may also be used to store instructions for managing a trust. While machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment described and shown by way of illustration is in no way intended to be considered limiting. Therefore, references to details of various embodiments are not intended to limit the scope of the claims, which in themselves recite only those features regarded as the invention.

What is claimed is:

1. A method comprising:
subscribing a computing device to receive change events associated with a portion of a multi-tenant database, the change events stored in a plurality of logs where each log corresponds to a time interval;
accessing the plurality of logs in parallel, without consideration to the time interval of each log, to retrieve the change events;
storing the plurality of change events in a persistent data store separate from the multi-tenant database;
processing the plurality of change events to create an ordered set of change events; and
providing the computing device with access to the ordered set of change events.

2. The method of claim 1, wherein storing the plurality of change events comprises storing the plurality of changed events of a plurality of logs in parallel into the persistent data store that is separate from the multi-tenant database.

3. The method of claim 1, wherein the multi-tenant database comprises a relational database with tabular relations and wherein the persistent data store comprises a non-relational distributed data store without tabular relations.

4. The method of claim 1, wherein the log comprises a plurality of write ahead log files of the multi-tenant database and wherein the plurality of change events comprise write aheadrecords that each comprise a change vector of the multi-tenant database.

5. The method of claim 1, wherein the portion of the multi-tenant database corresponds to a particular tenant represented by an organization identifier.

6. The method of claim 1, further comprising receiving a client request to migrate the portion of the multi-tenant database from a first geographic location to a multi-tenant database at a second geographic location.

7. The method of claim 1, further comprising:
receiving a client request to copy the portion of the multi-tenant database to the computing device, wherein the computing device comprises a database;
streaming the ordered set of change events to the computing device;
causing the ordered set of change events to be applied to the database on the computing device;
restricting access to the portion of the multi-tenant database; and
providing access to a portion of the database on the computing device that corresponds to the portion of the multi-tenant database.

8. The method of claim 1, wherein each change event of the ordered set of change events comprises a change identifier and the change events of the ordered set are sorted in view of the change identifier, wherein the change identifier is a monotonically increasing numeric value assigned by the multi-tenant database in response to an occurrence of a change to the portion of the multi-tenant database.

9. The method of claim 1, wherein the plurality of change events comprise committed change events and uncommitted change events of the multi-tenant database, and wherein the ordered set comprises each of the committed change events.

10. The method of claim 1, wherein the log comprise a first log corresponding to a first node of the multi-tenant database and a second log corresponding to a second node of the multi-tenant database.

11. The method of claim 1, wherein processing the plurality of change events comprises processing the plurality of change events in a non-chronological order and adding them to the ordered set of change events.

12. The method of claim 1, wherein providing the computing device with access to the ordered set of change events comprises streaming the change events in a chronological order.

13. The method of claim 1, wherein accessing the plurality of change events stored in the log of the multi-tenant database comprises:
- determining an identifier that corresponds to the portion of the multi-tenant database;
- submitting a query for change events for the portion of the multi-tenant database, the query comprising the identifier; and
- receiving the plurality of change events.

14. A computer-system comprising:
- a memory; and
- a processing device communicatively coupled to said memory, said processing device configured to:
- subscribe a computing device to receive change events associated with a portion of a multi-tenant database, the change events stored in a plurality of logs where each log corresponds to a time interval;
- access the plurality of logs in parallel, without consideration to the time interval of each log, to retrieve the change events;
- store the plurality of change events in a persistent data store separate from the multi-tenant database;
- process the plurality of change events to create an ordered set of change events; and
- provide the computing device with access to the ordered set of change events.

15. The computer-system of claim 14, wherein the multi-tenant database comprises a relational database with tabular relations and wherein the persistent data store comprises a non-relational distributed data store without tabular relations.

16. The computer-system of claim 14, wherein the log comprises a plurality of write ahead log files of the multi-tenant database and wherein the plurality of change events comprise write ahead records that each comprise a change vector of the multi-tenant database.

17. A non-transitory computer-readable storage medium programmed to include instructions that, when executed by a processing device, cause the processing device to perform a method comprising:
- subscribing a computing device to receive change events associated with a portion of a multi-tenant database, the change events stored in a plurality of logs where each log corresponds to a time interval;
- accessing the plurality of logs in parallel, without consideration to the time interval of each log, to retrieve the change events;
- storing the plurality of change events in a persistent data store separate from the multi-tenant database;
- processing the plurality of change events to create an ordered set of change events; and
- providing the computing device with access to the ordered set of change events.

18. The non-transitory computer-readable storage medium of claim 17, wherein the multi-tenant database comprises a relational database with tabular relations and wherein the persistent data store comprises a non-relational distributed data store without tabular relations.

19. The non-transitory computer-readable storage medium of claim 17, wherein the log comprises a plurality of write ahead log files of the multi-tenant database and wherein the plurality of change events comprise write ahead records that each comprise a change vector of the multi-tenant database.

20. The non-transitory computer-readable storage medium of claim 17, wherein the portion of the multi-tenant database corresponds to a particular tenant represented by an organization identifier.

* * * * *